United States Patent
Liang et al.

(10) Patent No.: US 9,314,983 B2
(45) Date of Patent: Apr. 19, 2016

(54) AUTOMATED DOOR ASSEMBLY, PRESS, AND ADHESIVE THEREFOR

(71) Applicant: MASONITE CORPORATION, Tampa, FL (US)

(72) Inventors: Bei-Hong Liang, Naperville, IL (US); George Cucchi, Odessa, FL (US)

(73) Assignee: Masonite Corporation, Tampa, FL (US)

( * ) Notice: Subject to any disclaimer, the term of this patent is extended or adjusted under 35 U.S.C. 154(b) by 202 days.

(21) Appl. No.: 13/956,855

(22) Filed: Aug. 1, 2013

(65) Prior Publication Data

US 2013/0340926 A1 Dec. 26, 2013

Related U.S. Application Data

(63) Continuation-in-part of application No. 13/193,183, filed on Jul. 28, 2011.

(60) Provisional application No. 61/368,604, filed on Jul. 28, 2010, provisional application No. 61/368,889, filed on Jul. 29, 2010.

(51) Int. Cl.
*B29C 65/00* (2006.01)
*B30B 5/06* (2006.01)
(Continued)

(52) U.S. Cl.
CPC ............. *B29D 99/00* (2013.01); *B30B 7/023* (2013.01); *B32B 5/06* (2013.01); *B32B 7/14* (2013.01); *E06B 3/7001* (2013.01); *B32B 2307/554* (2013.01); *B32B 2479/00* (2013.01); *E06B 3/822* (2013.01); *Y10T 156/1002* (2015.01)

(58) Field of Classification Search
CPC ........ B30B 15/061; B30B 5/06; B30B 5/065; B30B 5/067; B30B 15/30; B30B 7/023; B30B 7/02; B29C 2043/483; B32B 37/1027; Y10T 156/1002

See application file for complete search history.

(56) References Cited

U.S. PATENT DOCUMENTS 1,870,517 A 8/1932 Lacey
2,565,779 A 8/1951 Muddiman
(Continued)

FOREIGN PATENT DOCUMENTS

CN 201061892 Y 5/2008
DE 2733765 A1 2/1979
(Continued)

OTHER PUBLICATIONS

Machine translation of German Patent Publication No. DE-3032914A1, originally published Apr. 1982, 11 pages.*

(Continued)

*Primary Examiner* — William Bell
(74) *Attorney, Agent, or Firm* — Berenato & White, LLC

(57) ABSTRACT

Provided is a system and method of making a door having first and second door skins and an internal frame. The top and bottom surfaces of the frame are coated with an adhesive and the frame is placed on a first door skin. The second door skin is then placed on the opposite surface of the frame. The assembled components are then pressed to bond the first and second door skins to the frame with a press having upper and lower dies configured to impart a larger compression force toward a central area of the door skins. Wear resistant belts or membranes are provided to protect the door skins from being marred by the upper and lower dies during the pressing process.

10 Claims, 12 Drawing Sheets

(51) Int. Cl.
  *B30B 15/06* (2006.01)
  *B29D 99/00* (2010.01)
  *B32B 5/06* (2006.01)
  *B32B 7/14* (2006.01)
  *B30B 7/02* (2006.01)
  *E06B 3/70* (2006.01)
  *E06B 3/72* (2006.01)
  *E06B 3/82* (2006.01)

(56) References Cited

U.S. PATENT DOCUMENTS

| | | |
|---|---|---|
| 2,735,461 A | 2/1956 | Pater |
| 2,889,586 A | 6/1959 | Akerberg |
| 2,993,244 A | 7/1961 | James |
| 3,132,981 A | 5/1964 | Stack |
| 3,225,505 A | 12/1965 | Lytz |
| 3,367,823 A | 2/1968 | Clausen et al. |
| 3,389,652 A | 6/1968 | Bruder et al. |
| 3,616,090 A | 10/1971 | Larson |
| 3,671,615 A | 6/1972 | Price |
| 3,765,993 A | 10/1973 | Raffensparger et al. |
| 3,824,058 A | 7/1974 | Axer et al. |
| 3,963,552 A | 6/1976 | Troutner et al. |
| 4,039,369 A | 8/1977 | Versteege |
| 4,342,615 A | 8/1982 | Koch, II |
| 4,517,148 A | 5/1985 | Churchland |
| 4,643,787 A | 2/1987 | Goodman |
| 4,842,669 A | 6/1989 | Considine |
| 5,020,966 A | 6/1991 | Kiker |
| 5,142,835 A | 9/1992 | Mrocca |
| 5,155,959 A | 10/1992 | Richards et al. |
| 5,167,105 A | 12/1992 | Isban et al. |
| 5,177,868 A | 1/1993 | Kyle et al. |
| 5,415,943 A | 5/1995 | Groger et al. |
| 5,560,168 A | 10/1996 | Gagne et al. |
| 5,588,996 A | 12/1996 | Costello |
| 5,665,197 A | 9/1997 | Fujii et al. |
| 5,752,594 A | 5/1998 | Fournier |
| 5,776,292 A | 7/1998 | Fujii et al. |
| 5,875,609 A | 3/1999 | Quinif |
| 5,875,710 A * | 3/1999 | Honda et al. .................. 100/196 |
| 5,992,127 A | 11/1999 | Quinif |
| 6,067,699 A | 5/2000 | Jackson |
| 6,085,813 A | 7/2000 | Elliott et al. |
| 6,125,901 A | 10/2000 | Englisch et al. |
| 6,132,836 A | 10/2000 | Quinif |
| 6,170,224 B1 | 1/2001 | Boyse et al. |
| 6,389,769 B1 | 5/2002 | McKinney et al. |
| 6,811,647 B1 | 11/2004 | Graf et al. |
| 7,314,534 B2 | 1/2008 | Hardwick |
| 7,501,037 B2 | 3/2009 | Stroup et al. |
| 7,819,163 B2 | 10/2010 | Tyler |
| 8,123,895 B2 | 2/2012 | Tyler |
| 8,171,700 B2 | 5/2012 | Barnes |
| 2001/0030103 A1 | 10/2001 | Runonen |
| 2002/0100996 A1 | 8/2002 | Moyes et al. |
| 2003/0173734 A1 | 9/2003 | Wong et al. |
| 2004/0096535 A1 | 5/2004 | Hudecek et al. |
| 2005/0102940 A1 | 5/2005 | Tyler |
| 2007/0295054 A1 | 12/2007 | Karlsson |
| 2009/0071609 A1 | 3/2009 | Stroup et al. |
| 2009/0211688 A1 | 8/2009 | Perttila et al. |
| 2009/0272489 A1 * | 11/2009 | Clark et al. .................. 156/280 |
| 2012/0027999 A1 | 2/2012 | Liang et al. |

FOREIGN PATENT DOCUMENTS

| | | |
|---|---|---|
| DE | 3032914 A1 * | 4/1982 |
| DE | 4428768 A1 * | 2/1996 |
| DE | 19916041 A1 | 10/2000 |
| DE | 10224793 C1 | 7/2003 |
| EP | 0860253 A2 | 8/1998 |
| EP | 1260329 A2 | 11/2002 |
| EP | 2025481 A2 | 2/2009 |
| EP | 2258916 A1 | 12/2010 |
| EP | 2415571 A2 | 2/2012 |
| GB | 2293853 A | 4/1996 |
| JP | 59118618 A | 7/1984 |
| JP | 2001032436 A | 2/2001 |
| JP | 2005104052 A | 4/2005 |
| WO | 2005087464 A1 | 9/2005 |

OTHER PUBLICATIONS

International Search Report, International Application No. PCT/US2014/030297, mailed Jun. 12, 2014.

Dexheimer et al, "Hot-Melt Adhesives", Adhesives in Manufacturing, p. 325, 1983.

Machine Translation of European Patent Application Publication No. EP-2025481A2, published Feb. 2009, 6 pages.

\* cited by examiner

AUTOMATED DOOR ASSEMBLY, PRESS, AND ADHESIVE THEREFOR

CROSS-REFERENCE TO RELATED APPLICATIONS AND CLAIMS TO PRIORITY

This application is a continuation-in-part of application Ser. No. 13/193,183, filed Jul. 28, 2011, and is related to Provisional Application No. 61/368,604, filed Jul. 28, 2010, and Provisional Application No. 61/368,889, filed Jul. 29, 2010, the disclosures of which are incorporated herein by reference and to which priority is claimed.

FIELD OF THE INVENTION

The present invention is directed to an automated system and method for manufacturing a door having first and second door facings and an internal door frame.

BACKGROUND

Doors are typically made from two molded or flush door skins attached to opposite sides a central door frame. The door facings are often molded from a wood fiber and resin compound, although fiberglass resin formed polymer door facings are known. The door frame typically includes stiles and rails made of wood located around the perimeter of the door. The interior of the door may optionally include a core.

Manual assembly of doors is relatively labor intensive, expensive, and subject to quality variations. During manual assembly, a door facing is placed on a production table with its intended exterior surface face down. Adhesive is then applied to the stiles and rails of a frame. The adhesively coated frame parts are then placed on the door facing on the table. Adhesive applied to a second side of the stiles and rails faces upwardly and a second door facing is placed with its exterior surface face upon the second side of the frame. The resulting assembled door is stacked at a holding station so that additional doors may be assembled. The assembled doors should be handled carefully, given that the components of the door can easily shift during transportation.

Each successive door assembly is stacked on top of the previous door assembly until a predetermined quantity of door assemblies has been stacked. The stack of door assemblies is then transported to and loaded in a press. The press applies pressure to the entire stack for a period of time sufficient to allow the adhesive to bond the door facings to the frame. Conventional adhesives, such as polyvinyl acetate, may take approximately thirty minutes or more in-press before the door reaches "green" strength. The door achieves green strength when the adhesive has reached sufficient bonding strength to hold the door components together for further handling.

Once an acceptable green strength is achieved, the doors may be removed from the press and moved to an in-process inventory until the adhesive reaches maximum cure strength. Depending on the adhesive used, the doors may need to remain in inventory for a relatively long period of time, for example two hours or more, or even as long as twenty-four hours, before the adhesive reaches maximum bonding strength.

After reaching maximum cure strength the doors are then moved to a final processing station. Final processing includes edge trimming the doors to customer specification and optional coating and/or painting of door skins and exposed edges of the stiles and rails around each door perimeter. Using this process, manufacturing time for a door may be twenty-four hours or more, from the time production is initiated to the resulting finished door is complete.

SUMMARY

In accordance with an embodiment, a door-making system includes at least one coating station, at least one assembly station, and at least one pressing station. The coating station applies adhesive to at least one of a door frame, a first door skin, and a second door skin. The assembly station joins the first and second door skins to opposite surfaces of the frame. The pressing station includes a first press and a second press for alternately receiving the assembled doors.

In accordance with a further embodiment, a door pressing station includes at least one press having an upper die and a lower die. The upper die has an upper convex surface and the lower die has a lower convex surface. The upper and lower convex surfaces face one another to define a mold cavity.

In accordance with a further embodiment, a method of making a door includes adhesively bonding a first door skin and a second door skin to opposite sides of a frame to assembly doors as part of a production process. The assembled doors are alternately received in a first press and a second press.

In accordance with a another embodiment, a method of pressing an assembled door includes loading an assembled door into a press having an upper die with an upper convex portion and a lower die with a lower convex portion. The upper and lower convex surfaces face one another to press the door assembly.

Other embodiments, including apparatus, systems, methods, and the like which constitute part of the invention, will become more apparent upon reading the following detailed description of the exemplary embodiments and viewing the drawings. It is to be understood that both the foregoing general description and the following detailed description are exemplary and explanatory only and therefore not restrictive.

DETAILED DESCRIPTION OF EXEMPLARY EMBODIMENT(S) AND EXEMPLARY METHOD(S)

Figure 1:
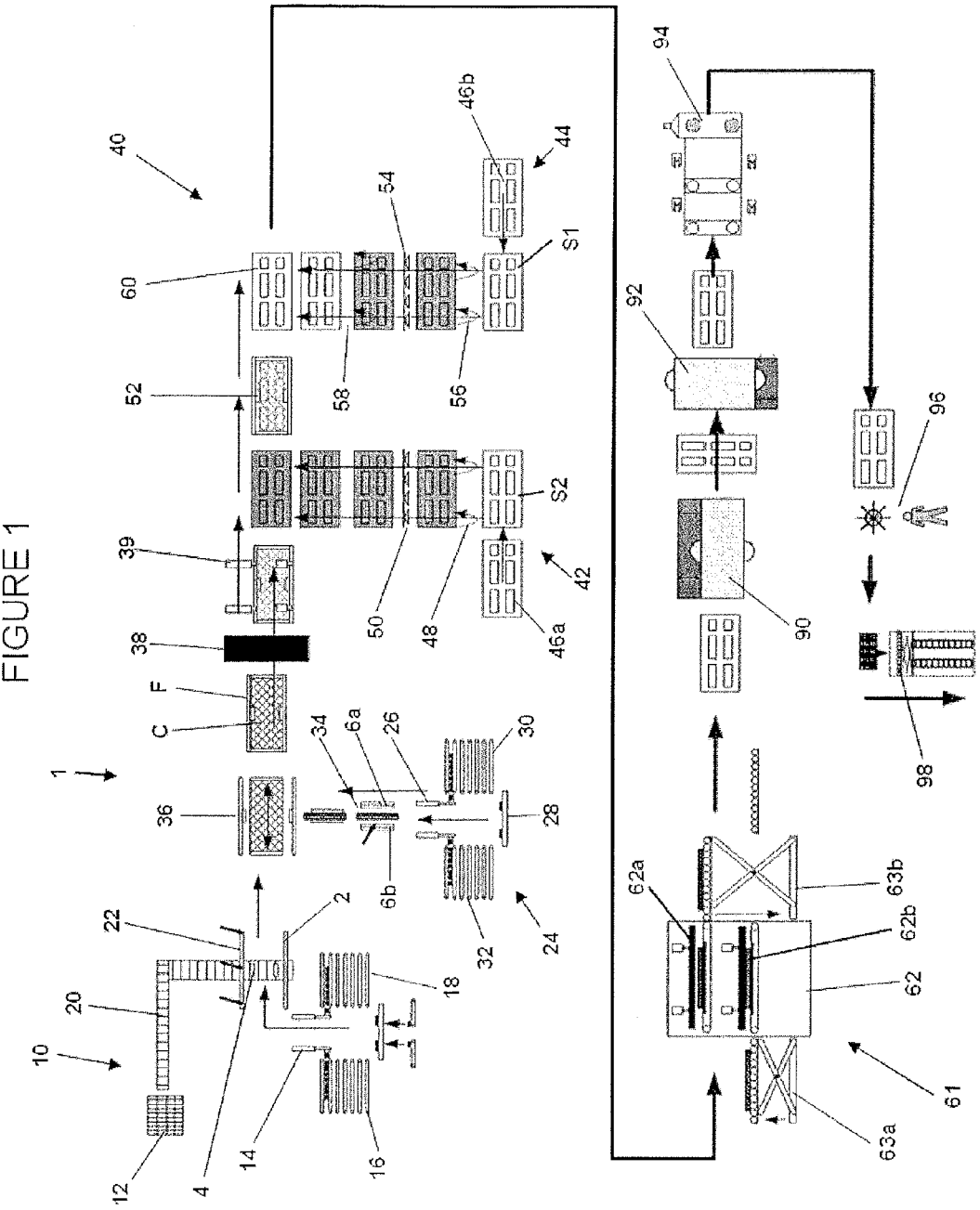
FIG. 1 is a schematic view of an exemplary automated door production line.

Reference will now be made in detail to exemplary embodiments and methods as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

FIG. 1 depicts an automated door production line 1. In an exemplary embodiment, the door production line 1 is a synchronous system designed to operate at a specific rate of movement, for example, one door produced per unit of time. In order to avoid bottlenecks, each step in the process, including transportation, occurs at the specific rate of movement. Therefore, it is important to provide suitable press time and proper adhesive application to sufficiently bond the components of the door together. Improper bonding can lead to quality issues.

Figure 2:
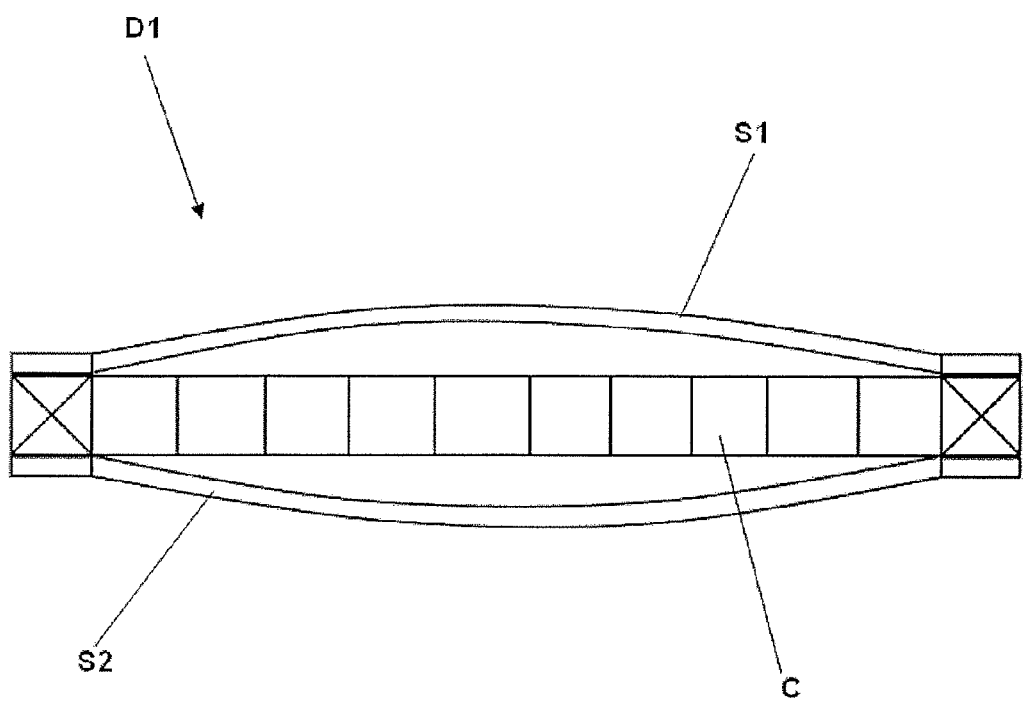
FIG. 2 is a sectional, plan view of a defective door.

FIG. 2 shows a door D1 having such quality issues. Improper bonding time can cause the separation or delamination of the door skins S1, S2 from the core element C. Delamination is especially persistent in door skins S1, S2 having a number of molded panels. For example, molded six panel door skins S1, S2 bonded to a core C with a hot melt adhesive using conventional processes may experience delamination across the width of the door D1. The delamination between skins S1, S2 and the core C is an indication of internal polyurethane (PUR) adhesive bond failure which may be caused by tension stresses or spring-back of the bowed skins and compressed core areas in the ovolos, or molded panel design areas, of the molded skins S1, S2. In these cases, the initial green or set strength of various PUR formulations along with typical PUR roll coating and door pressing approaches may not overcome the stresses leading to delamination. Pre-cured back surfaces of the door skins S1, S2 may also prevent effective PUR wetting when the adhesive is applied only to the frame. To overcome these deficiencies various improvements in the process have been made.

FIG. 1 shows the production line 1 having an exemplary series of stations for assembling a door. Various material handling and movement devices and methods may be used to transport components of the door assembly, and are simply designated by the arrows in the individual stations and between stations. Material handling and movement devices may include, for example, conveyors, gantry, manipulators, grippers, automated guided vehicles, and automated storage/retrieval systems. The components and stations of the production line may be operated by an operator's control, automatically utilizing various sensors including optical, magnetic, and radio sensors, or any combinations of manual and automatic operation. Though specific examples of material handling and movement may be provided in the exemplary description of certain stations, these may be modified as would be understood by one of ordinary skill in the art upon viewing this disclosure.

As shown in FIG. 1, a stile assembly station 10 includes a lock block indexing device 12 and a stile indexing device 14. In an exemplary embodiment the stile indexing device 14 removes stiles 2 from a first stile conveyor 16 and a second stile conveyor 18. A single stile conveyor, a set of first and second stile conveyors 16, 18, or more than two stile conveyors may be utilized depending on the throughput rate. More stile conveyors or sets of stile conveyors allow an increase in the throughput rate of the production line 1. When a pair of stiles 2 have been removed from the top level conveyor of the first and second sets of stile conveyors 16, 18, a new pair of stiles 2 is delivered to the top level conveyor to replace them. Because conveying the stiles 2 to the appropriate position to be picked up by the stile indexing device 14 may take longer than the movement rate of the system, the stile indexing device 14 alternatively may take the next pair of stiles 2 from the next level of conveyors.

As the stiles 2 are being retrieved by the stile indexing device 14, lock blocks 4 are removed by the lock block indexing device 12 and moved along a conveyor 20 or other suitable material transportation device. The lock blocks 4 may be removed by the lock block indexing device 12 in a manner similar to the stiles 2, or the lock blocks 4 may be removed from a pallet containing multiple lock blocks 4. Both the stiles 2 and the lock blocks 4 are moved to a lock block attachment station 22. At the lock block attachment station 22, the lock blocks 4 are connected to the stiles 2. The lock blocks 4 may be attached to the stiles 2 via adhesive, for example a hot melt adhesive, a mechanical fastener, or a combination thereof. While FIG. 1 depicts a lock block 4 being attached to each stile 2, optionally only a single lock block 4 may be attached. The movement and handling of all the components in stations 10 and 22 may be handled manually or automatically by robotic systems such as pick and place robotic arms, robotic indexers, and the like.

Rail assembly station 24 includes a rail indexing device 26 which selects a pair of rails 6a, 6b from a rail conveyor system 28. In an exemplary embodiment the rail conveyor system 28 includes a top rail conveyor 30 and a bottom rail conveyor 32, though a single rail conveyor, or more than two rail conveyors may alternatively be used as discussed above in connection with the first and second stile conveyors 16, 18. As shown in FIG. 1, a single top rail 6a may be selected from the top rail conveyor 30 and a single bottom rail 6b is selected from the bottom rail conveyor 32. In various exemplary embodiments, a door having more than one top rail 6a, such as a double top rail (not shown), more than one bottom rail 6b, such as a double bottom rail (not shown), or both a double bottom rail and double top rail, and/or one or more intermediate rails (not shown) may be desired. Therefore, the rail indexing device 26 may be capable of variably selecting a single rail 6a, 6b or multiple rails from the top rail conveyors 30, the bottom rail conveyors 32, and optionally intermediate rail conveyors (not shown). If more than a single top and/or bottom rail 6a, 6b is selected, the two rails 6a, 6b are attached, for example, by fasteners or an adhesive such as a hot melt adhesive to form the double rail.

After being selected, the rails 6a, 6b are moved to a core attachment station 34. At the core attachment station 34, a core C is connected to the top rail 6a and the bottom rail 6b, for example, by a hot melt adhesive. The core C may be brought to the core attachment station 34 by a conveyor or indexing device (not shown) similar to those shown and described with respect to the lock blocks 4, stiles 2, or rails 6a, 6b. The core C may be an expandable core or a solid core, such as, fiberboard, or any suitable substance depending on the door. In an exemplary embodiment, the core C is an expandable corrugated cardboard core or honeycomb paper core. The production line 1 may be set up and utilized so that the core C is variable and optional so that different cores C may be selectively attached to the rails or omitted from the assembled frame. Optionally the core may be formed in situ.

The attached lock block 4 and stile 2 assembly and the attached rail 6a, 6b and optional core C are then transferred to the frame assembly station 36. Robotic handling devices such as a clamp and gantry system may be used to deliver the frame components to the frame assembly station 36. When an expandable core C is used, the rails 6a, 6b may be drawn apart to expand the core C. The rails 6a, 6b and stiles 2 are then attached together to form an assembled frame F. The rails 6a, 6b and stiles 2 may be attached with mechanical fasteners, an adhesive, for example, a hot melt adhesive, or any combination of fasteners and adhesive. In various exemplary embodiments, different combinations of the lock blocks 4, stiles 2, rails 6a, 6b, and core C may be preassembled before reaching the production line. It should be noted that the term frame F used throughout the rest of this description includes the assembled stiles 2, rails 6a, 6b, optional lock block(s) 4, and optional core C.

When the frame F is assembled, either through the assembly system and process described above, preassembly, or a combination thereof, the frame F is moved to a frame adhesive station 38. In an exemplary embodiment, the frame adhesive station 38 is capable of applying an adhesive to both sides of the frame F. Adhesive application may be accomplished by passing the frame F through a double roll coater of the frame adhesive station 38. In an exemplary embodiment, the roll coater applies adhesive to the frame F in an amount between about 6 and about 35 g/sft (grams per square foot) as measured on a surface of the stiles 2 or rails 6a, 6b. In various exemplary embodiments, the amount of adhesive is between about 15 and about 26 g/sft. This amount of adhesive may help prevent quality issues, such as pillowing discussed above. After the adhesive is applied, the frame F is transferred to a door skin assembly station 40. Robotic handling devices such as a clamp and gantry system 39 may be used to deliver the frame from the frame adhesive station 38 to the door skin assembly station 40.

The door skin assembly station 40 includes a first skin feeder 42 and a second skin feeder 44. The first skin feeder 42 may include a door skin pallet 46a or multiple pallets of door skins. Similarly, the second skin feeder 44 may include a door skin pallet 6b or multiple pallets of door skins S1, S2. In an exemplary embodiment, the first skin feeder 42 provides a bottom door skin S2 and the second skin feeder 44 provides a top door skin S1. The top and bottom door skins S1, S2 may be identical or different depending on the production requirements. The top and bottom door skins S1, S2 may be any variety of door skins including wood composite door skins, solid wood door skins, polymer door skins, sheet molding compound door skins, molded door skins, and flush door skins. Though two skin feeders 42, 44 are shown, a single skin feeder may be utilized which provides both the top and bottom door skins S1, S2.

Door skins S1, S2 may be unloaded from the pallets 46a, 46b and placed on a conveyor (not shown) either manually or through a robotic handling device such as a vacuum gantry. If the door skins S1, S2 are removed from the pallets 46a, 46b manually, the operator moving the door skins S1, S2 may perform a visual quality inspection. If a door skin S1, S2 is found to be unsatisfactory, the operator may place it on a disposal conveyor. If the door skin S1, S2 is found to be acceptable, the operator may place it on a production conveyor. Alternatively, the door skin S1, S2 may be removed from the pallets 46a, 46b with an automated device and a camera or set of cameras may be set up so that a remote operator can perform visual inspection. The operator is then able to determine if the door skins S1, S2 are acceptable and signal the robotic handling system to place the door skins S1, S2 on either the production conveyor or the disposal conveyor. In various exemplary embodiments, the inspection may be performed automatically by tactile inspection devices, such as touch probes, or non-tactile inspection devices, such as laser or optical sensors. For example, a camera may optically capture the image of a door skin S1, S2. The image may then be processed and measured by a microprocessor. If the door skin S1, S2 is acceptable, the microprocessor can signal the robotic handling device to place the door skin S1, S2 on the production conveyor. If the door skin S1, S2 is not accepted, the microprocessor signals the robotic handling device to place the door skin S1, S2 on the disposal conveyor.

The first and second pallets 46a, 46b may have door skins S1, S2 facing the same direction. For example, the door skins S1, S2 in pallets 46a, 46b may have an intended exterior surface (depicted in white) facing up. Depending on the parameters of the production line 1, the door skins S1, S2 from one or both pallets 46a, 46b may need to be flipped so that their intended interiorly disposed surface (shaded) is facing down. In the exemplary embodiment shown in FIG. 1, after a door skin S2 is removed from the first skin feeder 42, it is transferred to a first flipping station 48. The first flipping station may utilize any automated flipping apparatus, for example a star conveyor. Optionally, before the bottom door skin S2 is connected to the frame, a first adhesive applicator 50 applies a layer of adhesive to the interior surface of the door skin S2. The first adhesive applicator 50 may be a first spray coater with one or more spray heads.

Figure 3A:
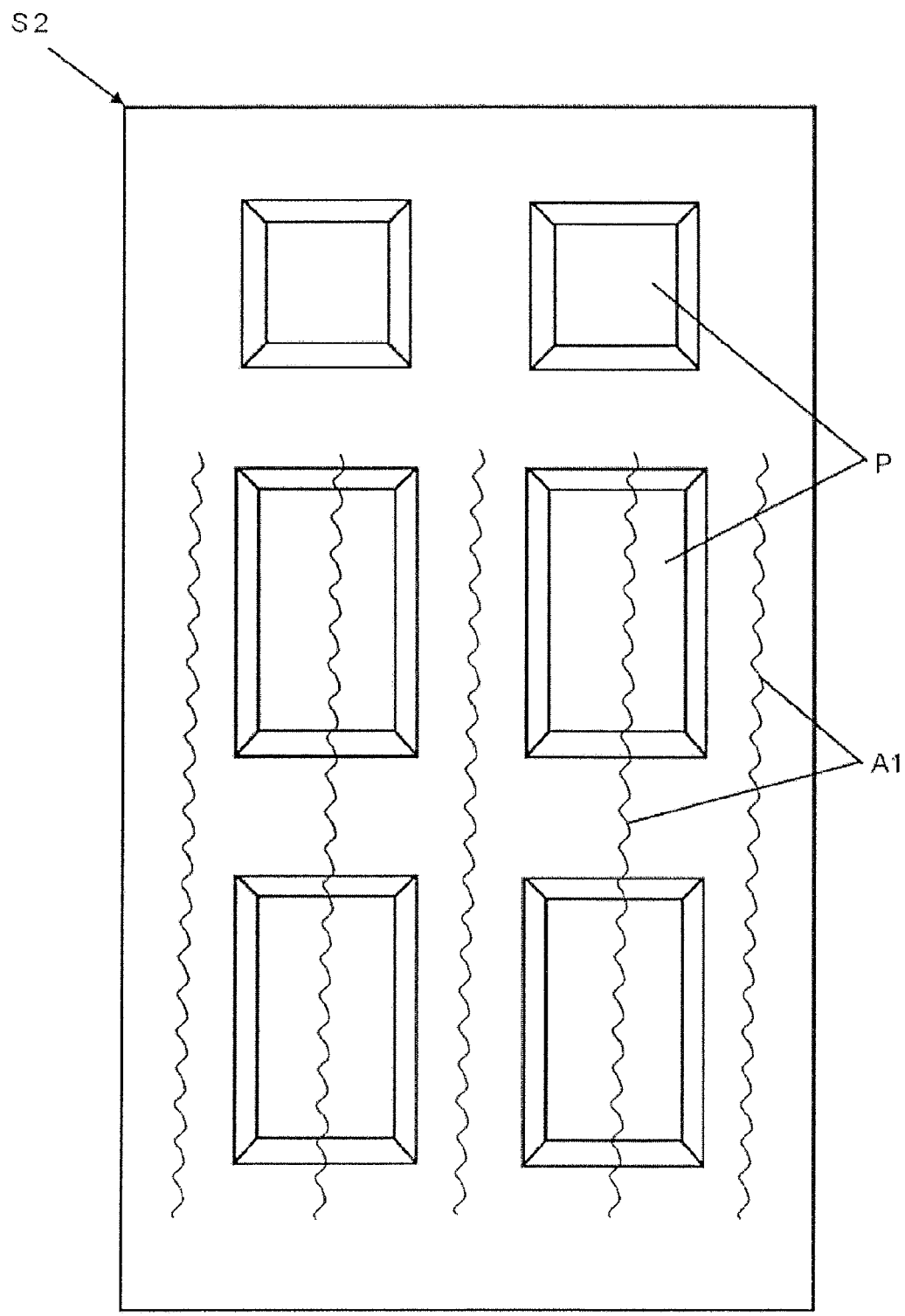
FIG. 3A is a plan view of an exemplary door facing having adhesive applied thereto.
Figure 3B:
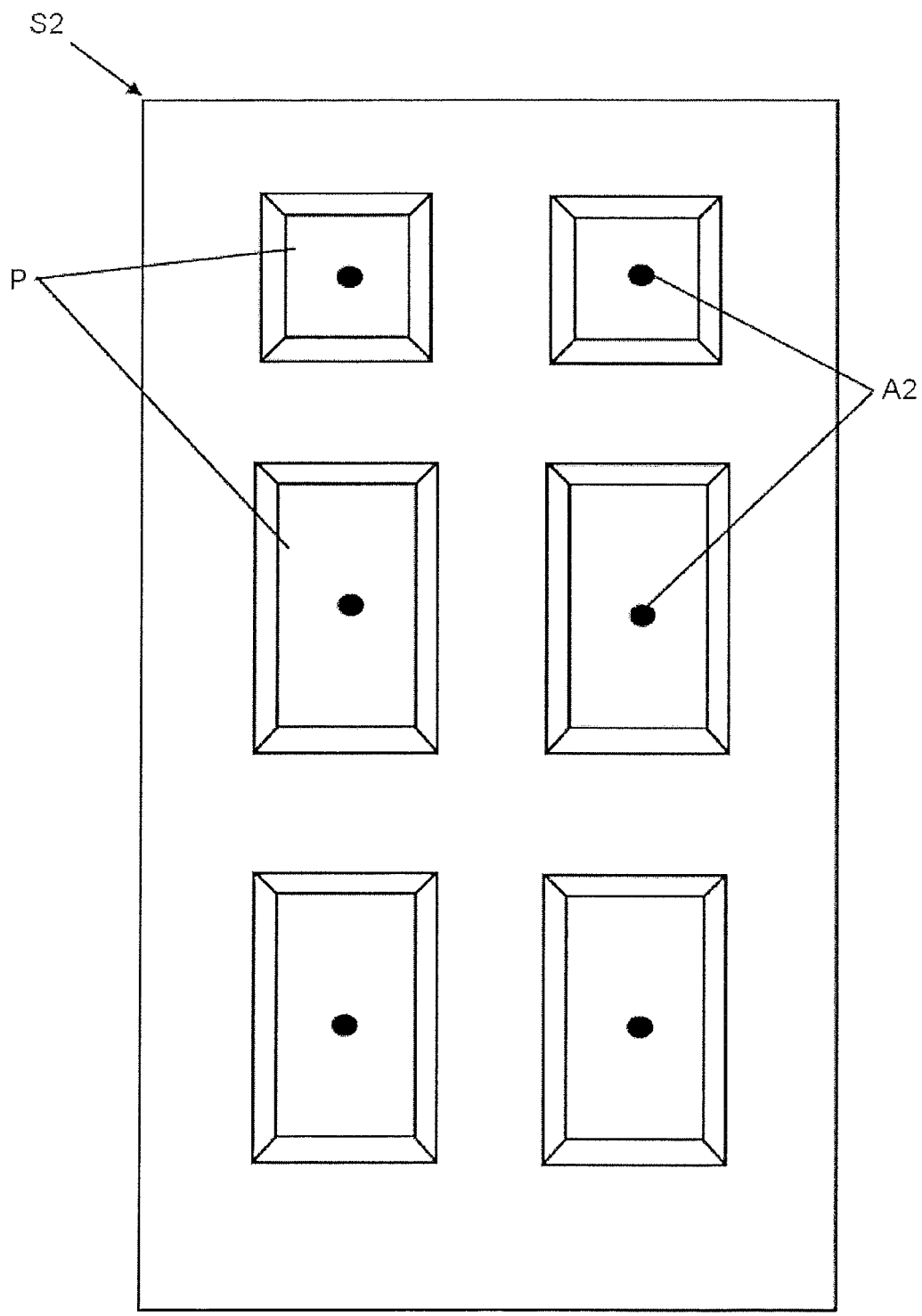
FIG. 3B is a plan view of another exemplary door facing having adhesive applied thereto.

In various exemplary embodiments, the first adhesive applicator 50 is capable of applying adhesive to the door skin S2 in beads or lines. As best shown in FIGS. 3A and 3B, the device may be a nozzle or jet capable of applying under pressure a liquid form of an adhesive, for example a hot melt adhesive such as PUR or ethylene vinyl acetate (EVA), to a door skin S2. The adhesive may be applied in individual lines, such as the wavy lines A1 as shown in FIG. 3A. The adhesive lines A1 are vertically orientated and placed just outside of and down the middle of the panels P. The type of adhesive application shown in FIG. 3A is one way to prevent delamination of the door skin S2 from the core C.

In the exemplary embodiment shown in FIG. 3B, a bead A2 of adhesive is applied to each panel P. Applying the adhesive to the door skin S2 in this way creates a spot-weld-type gluing effect when the door skin S2 is pressed to the core C, further bonding the door skin S2 and the core C reducing the chance of delamination. Various other glue patterns, such as a web pattern or a checkered pattern, or combinations of glue patterns may be utilized depending on the configuration and design of the door skins S1, S2. In various exemplary embodiments, the first adhesive applicator 50 is capable of applying different adhesives in a variety of patterns and locations so that different door types may be made on a single production line 1.

After the optional adhesive application, the bottom door skin S2 is moved to the first door assembly station 52. The bottom door skin S2 may be moved by a robotic handling device such as a vacuum gantry, conveyor, or combination thereof. The adhesively coated frame F is transported to the first door assembly station 52 and placed onto the bottom door skin S2. Various stops, limits, tactile sensors, and non-tactile sensors may be used to align and position the bottom door skin S2 and the frame F.

Similar to the bottom door skin S2, the top door skin S1 is transferred from the second skin feeder 44. The top door skin S1 may have an optional adhesive coating applied by a second adhesive applicator 54. The second adhesive applicator 54 may include all the features and capabilities discussed above with respect to the first adhesive applicator 50. Accordingly, the second adhesive applicator 54 may be identical to or different from the first adhesive applicator 50.

As discussed above, the second pallet of skins 46b has the exterior surface of the top door skins S1 facing up. Therefore, to apply adhesive to the interior surface, the top door skin S1 is flipped at a second flipping station 56. Because the top door skin S1 is placed onto the top surface of the frame F, it must be flipped again at a third flipping station 58 after the adhesive is applied. Various exemplary embodiments may omit application of adhesive to the top door skin S1 and therefore the second and third flipping stations 56, 58 may be bypassed or omitted. Additionally, the second adhesive applicator 54 may be capable of applying adhesive from underneath the top door skin S1 so that the second and third flipping stations 56, 58 may be omitted. Alternatively, the door skins S1, S2 in pallets 46a, 46b may be provided interior-side up so as to avoid the use of the flipping stations 48, 56.

After the optional adhesive application, the top door skin S1 is moved to a second door assembly station 60. At the second door assembly station 60 the top door skin S1 is placed onto the frame F opposite the bottom door skin S2 so that the interior surface of the top door skin S1 faces down towards the frame F. Various stops, limits, tactile sensors, and non-tactile sensors may be used to align and position the door skin S1 and the frame F.

In various exemplary embodiments, the door skin assembly station 40 includes a device or devices for applying a liquid, for example water, to the inner surface of the door skins S1, S2 before they are attached to the frame. A spray head or other suitable device can apply water, for example in a misting spray, to the inner surface of the door skins S1, S2. The liquid may be applied by the first and second adhesive applicators 50, 54 in connection with an adhesive or variably without an adhesive. Alternatively, the liquid may be applied prior to, or subsequent the optional adhesive application. The application of water helps prevent warping and may improve skin wetting and increase the bond quality between resin that may be present in the door skins S1, S2 and the frame and the core C. The amount of water applied is enough to dampen the inner surface of the door skins S1, S2, though more water may be applied so that the moisture permeates at least partially into the door skins S1, S2. Other surface treatments may also be applied to the surface in addition to water or alternatively to water in order to increase bond quality.

After the top door skin S1 is connected to the frame F, the assembled door is transferred to a pressing station 61 where the door is pressed to more fixedly bond the door skins S1, S2 to the frame F and core C. As discussed above, because the production line 1 is automated, each step is performed at the set rate of movement to avoid bottlenecks. For example, the amount of time for the lock block attachment station 22 to attach the lock blocks 4 to the stiles 2 is equal to rate of movement, the time for the frame F to be transferred to the first door assembly station 52 equals the rate of movement, and the time in between completed doors coming off the production line 1 is equal to the rate of movement. In various exemplary embodiments, the rate of movement of the presently described system is about 7 seconds to about 15 seconds, for example about every 8 seconds, though the time may vary depending on several factors such as the adhesive selected, as would be understood by one of ordinary skill in the art upon viewing this disclosure. The rate of movement may not be long enough, however, for sufficient bond strength to form between the door skins S1, S2 and the frame F and core C.

To allow for a pressing time that exceeds the rate of movement, a double press 62 is used. The double press includes an upper press 62a and a lower press 62b. As shown in FIG. 1, a first assembled door is transferred onto a loading table 63a. The loading table 63a may be a two-position table and may include a conveyor device, such as powered rollers, to move the assembled doors on and off the loading table 63a. The loading table 63a places an assembled door into one of the top and bottom presses 62a, 62b, for example the bottom press 62b. After the production line 1 moves again, a second assembled door is loaded onto the loading table 63a and the loading table 63a is raised to place the second assembled door into the upper press 62a. After the production line 1 moves again, the first assembled door is removed from the lower press 62b and transferred to a discharging table 63b. The discharging table 63b may be a two-position table and may include a conveyor device, such as powered rollers, to move the assembled doors on to and off of the discharging table 63b. As the first door is transferred from the lower press 62b, the loading table 63a places a third assembled door in the lower press 62b to replace the first assembled door. Using the double press 62, the pressing of assembled doors is alternated between the upper and lower presses 62a, 62b. An assembled door can therefore undergo a pressing operation, which may include the opening and closing the dies of the upper and lower presses 62a, 62b, for approximately twice as long as the rate of movement. The extra press time allows a greater bond to be created between the door skins S1, S2, and the frame F and the core C.

In various exemplary embodiments, the press imparts approximately 100 psi to the door skins S1, S2 adjacent the stile and rail sections. The pressure along the remaining areas of the door skins S1, S2 covering the core C varies.

The double press 64 may also be capable of rapid closure. For example, an upper die 70 and a lower die 74 in each of the upper and lower presses 62a, 62b of the double press 62 may be capable of transitioning from an open position to contacting the door skins S1, S2 and reaching a final pressure in less than 10 seconds. In various exemplary embodiments, the double press 62 is capable of reaching final pressure in approximately one second or less. A fast closing double press 62 allows for a faster acting adhesive to be used and therefore quicker set and cure times.

Figure 4:
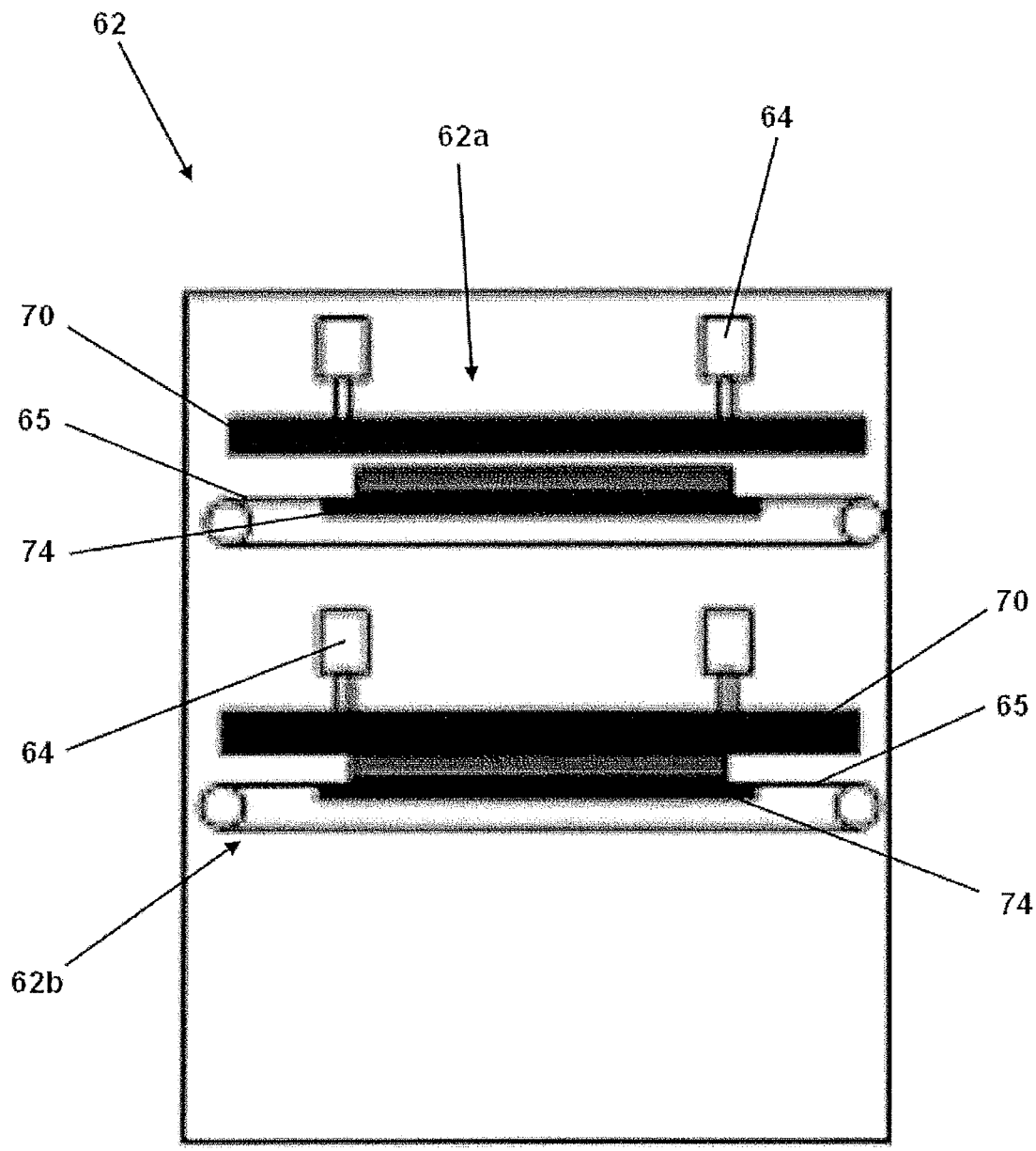
FIG. 4 is a plan, schematic view of an exemplary double press.

In various exemplary embodiments, one of the upper and lower dies 70, 74 or both dies 70, 74 may be moved towards and away from the assembled door to close the press. As best shown in FIG. 4, actuators 64, such as hydraulic or pneumatic cylinders may be connected to the upper die 70. FIG. 4 depicts the upper press 62a in an open position and the lower press 62b in a closed position. Each upper and lower press 62a, 62b may also include a conveyor 65, for example a belt conveyor or powered rollers, to assists in loading and discharging the assembled door from the respective press 62a, 62b. In an exemplary embodiment, at least part of the conveyor 65 is arranged to position the bottom door skin S2 above a stationary lower die 74. As best shown in FIG. 4, the lower die 74 may be located between the top part of the conveyor 65 and the bottom, or return, part of the conveyor 65. During the pressing operation, the upper die 70 closes, pressing the door assembly against the conveyor 65 and the lower die 74. The conveyor 65 should be made from a flexible material that is durable enough to withstand the pressure applied by the dies 70, 74. In various exemplary embodiments, the conveyor 65 may include a first side and a second side with an open center section (not shown). The first and second side may include belts or rollers and be positioned along the edges of the door to contact the door skins S1, S2 adjacent the frame F. The first and second side conveyors and open center section allow the lower die 74 to contact the central region of the bottom door skin S2 directly. Various other devices and methods for positioning the assembled doors D2 into the upper and lower presses 62a, 62b, for example a push rod, may also be used. The press 62 may also include various stops, limits, tactile sensors, and non-tactile sensors may be used to align and position the door to square the frame F before pressing.

Although the exemplary embodiments discussed above are with respect to a double press 62, it should be understood that the pressing apparatus may alternatively have three, four, five, or more presses. As the number of presses increases, the pressing time per press can likewise increase without slowing the overall movement time. Moreover, the presses 62a, 62b may be placed side-by-side on the same level or otherwise oriented as opposed to the stacked relationship shown in FIG. 1. Various material handling devices, such as a switching conveyor, may provide the assembled doors to the presses 65a, 65b in an alternating fashion.

Figure 5A:
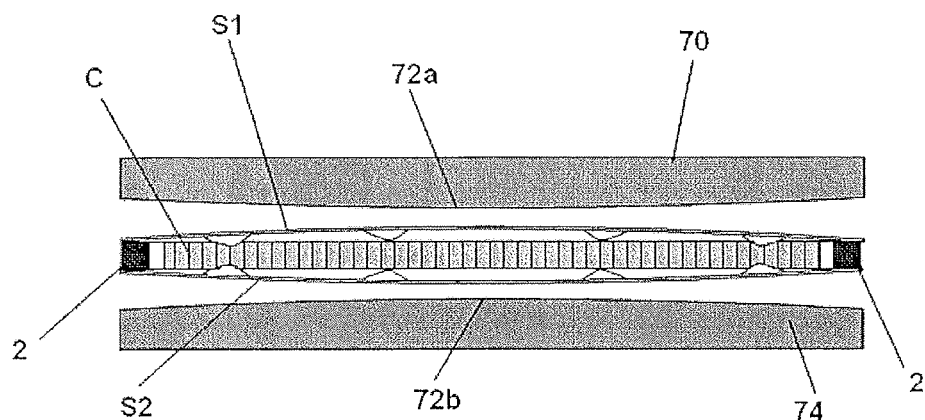
FIGS. 5A-5C are sectional, schematic views of an exemplary pressing process for a door assembly.
Figure 5B:
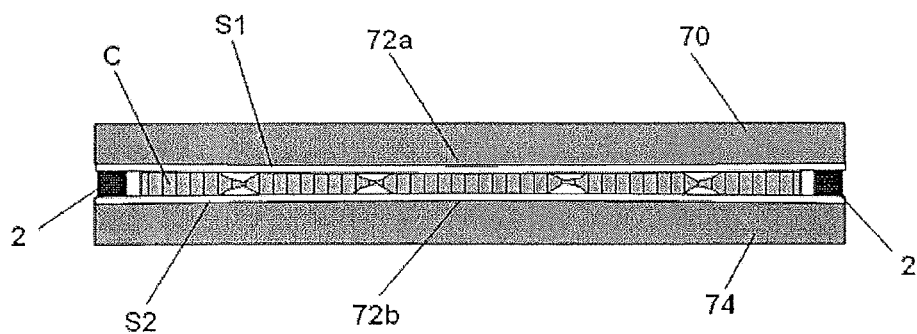
Figure 5C:
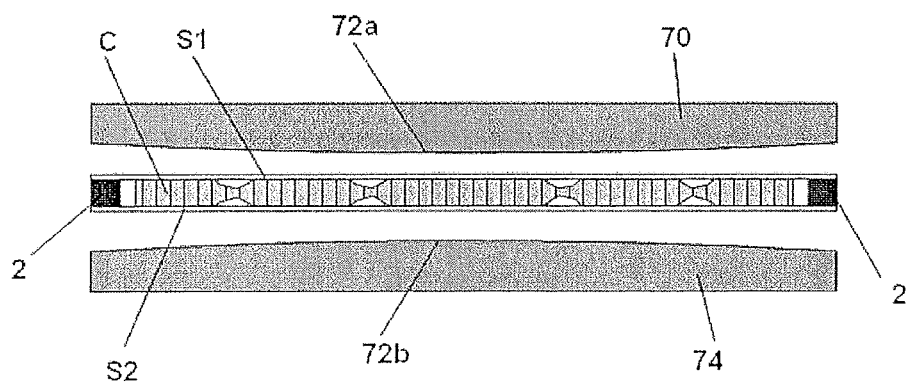

As shown in FIGS. 5A-5C, in various exemplary embodiments both the upper and lower presses 62a, 62b of the double press 62 include an upper die 70 having a convex portion 72a and a lower die 74 having a convex portion 72b. The convex portions 72a, 72b over compress at least the central portions of the top and bottom door skins S1, S2 so that at least part of the interior surface of the door skins S1, S2 is coplanar with or below the respective surface of the frame F to which the skin is attached. The over compression helps increase the bond between the door skins S1, S2 and the core C. In various exemplary embodiments, the radius of curvature of the convex portions 72a, 72b is between about 0.1 mm and about 2 mm. In certain embodiments the radius of curvature of the convex portions 72a, 72b is between about 0.2 mm and approximately 0.5 mm. The radius of curvature of the convex portions 72a, 72b may vary however, depending on design and production characteristics such as the design of the door, the size of the door, the press time, and the amount of pressure applied.

Figure 6:
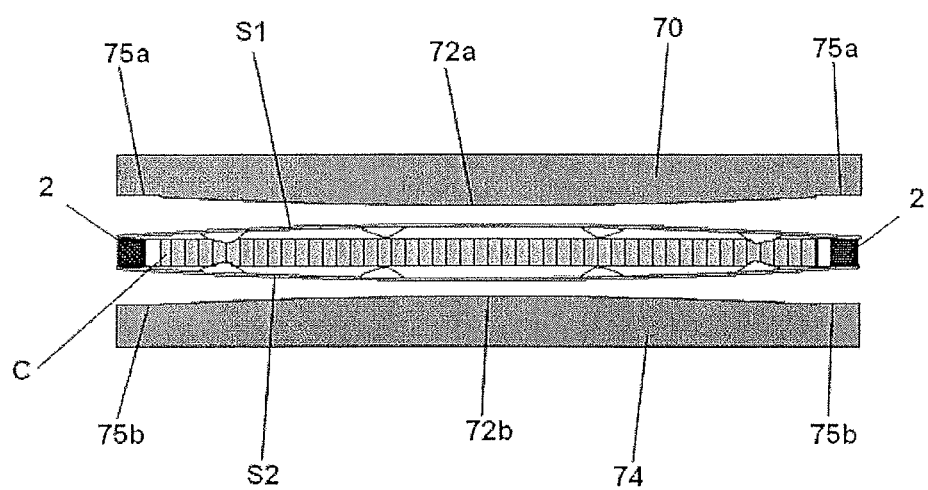
FIG. 6 is a sectional, schematic view of an exemplary press and door assembly.

FIGS. 5A-5C depict an exemplary embodiment where the convex portions 72a, 72b begin approximately at the outer edges of the upper and lower dies 70, 74. In an exemplary embodiment shown in FIG. 6, a flat section 75a, 75b extends around the outer edge of the dies 70, 74, and the convex portions 72a, 72b begin in a more centrally located region. The flat sections 75a, 75b may have approximately the width of typical stiles on the longitudinal sides and the width of typical rails on the lateral sides. The flat section 75a, 75b may also be slightly larger than a standard frame F size to accommodate different width doors, as the size of the convex sections 72a, 72b may be varied and still obtain desirable results. For example, relatively small central convex sections 72a, 72b compared to the length and width of a standard door may be provided in the upper and lower dies 70, 74 which could still effectively reverse the natural bowing of the door skins S1, S2 and therefore help prevent pillowing and delamination.

As best shown in FIG. 5A, when the door is placed into the press a strong adhesive connection may be present between the perimeters of the door skins S1, S2 and the stiles 2 and rails 6, but internal stresses in the door skins S1, S2 may lead to pillowing and separation from the core C. The pillowing effect can cause separation between the door skins S1, S2 and the core C of as much as 1 inch or greater, and can reach about 2 inches at the very center of the door skins S1, S2. As shown in FIG. 5B, when the press is closed, the convex portions 72a, 72b over compress the central portion of the door skins S1, S2 respectively. The over compression not only helps to bond the door skins S1, S2 to the core C, but also redirects the natural bowing of the door skins S1, S2. Because the door skins S1, S2 are fixed at the frame F, the internal forces have a tendency to push away from the frame F, forcing the door skins S1, S2 away from the core C. Once the bowing is reversed, any internal stresses remaining in the door skins S1, S2 are redirected inwards, pushing the center of the door skins S1, S2 towards the core C as opposed to away from it. As shown in FIG. 5C, when the press 64 is opened, the pillowing is eliminated and the door skins S1, S2 may return to an approximately flat shape. The resultant door has increased bond strength compared to typical doors with less chance of pillowing or delamination.

Figure 7A:
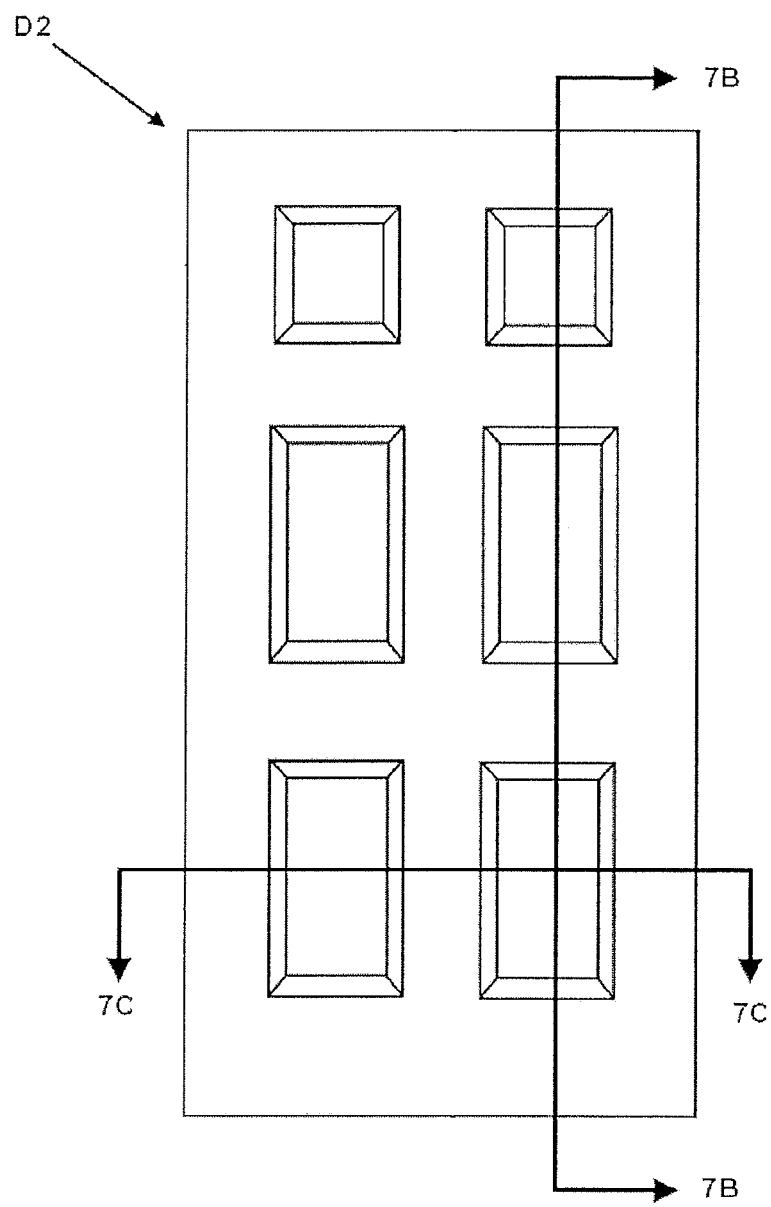
FIG. 7A is a plan view of an exemplary post-press door assembly.
Figure 7B:
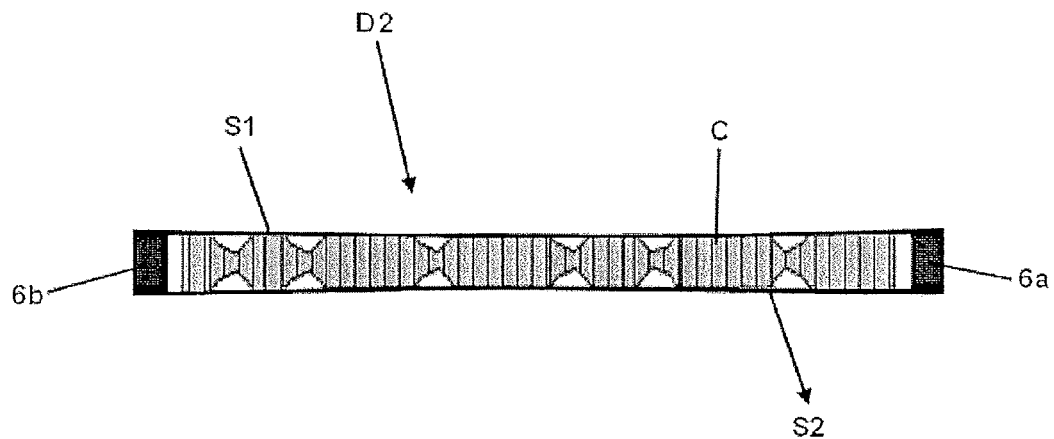
FIG. 7B is a sectional, plan view of the door assembly of FIG. 7A taken along line 7B-7B.
Figure 7C:
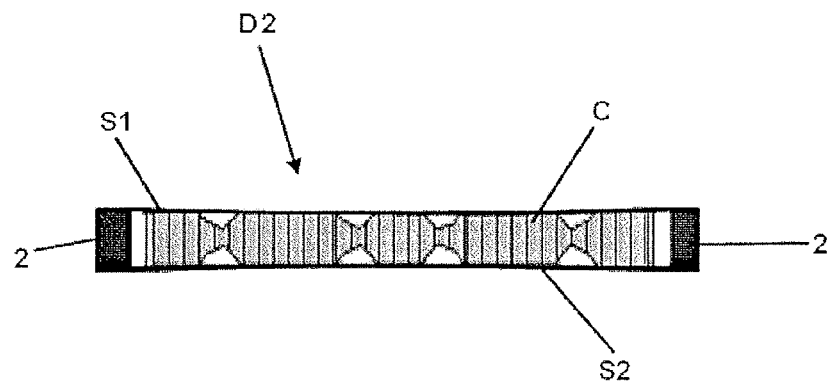
FIG. 7C is a sectional, plan view of the door assembly of FIG. 7A taken along line 7C-7C.

In various exemplary embodiments, the door skins S1, S2 may have a slight concave cross-sectional shape after pressing is complete. FIG. 7A shows a pressed door D2 and FIGS. 7B and 7C depict cross-sectional views of FIG. 7A showing the concave shape imparted to the door D2. It should be noted that the concave sectional profile shown in FIGS. 7B and 7C may not be to scale. The concave shape retained in the door skins S1, S2 after pressing is completed is due to the fact that the door skins S1, S2 may undergo plastic deformation resulting from the over compression and therefore will not return to a planar surface after the pressing operation. The concave shape, however, may be less than noticeable by the unaided human eye and therefore undetectable to consumers. For example, the resulting shape of the door skins S1, S2 may have a maximum concave depth that is less than the maximum convex height of the upper and lower dies 70, 74. In various exemplary embodiments, the maximum depth of the concave section, when present, is about 0.05 mm to about 0.5 mm.

Figure 8:
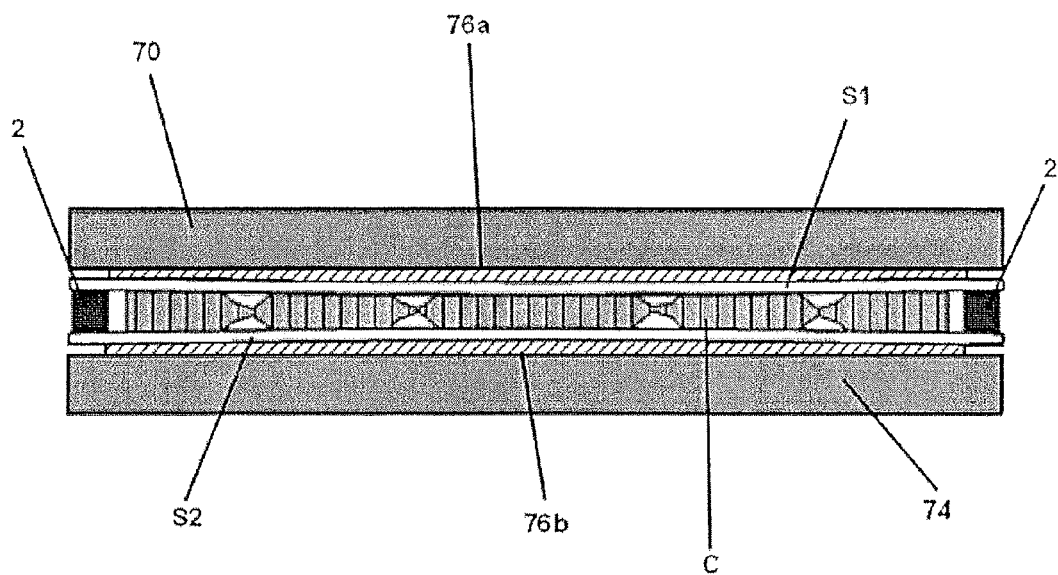
FIG. 8 is a sectional, schematic view of a door assembly in an exemplary door press utilizing spacers.

FIGS. 5A-5C depict an exemplary embodiment where the convex portions 72a, 72b are formed integrally with the upper and lower dies 70, 74. In various other exemplary embodiments an upper spacer 76a and a lower spacer 76b are inserted between the upper and lower dies 70, 74 and the door skins S1, S2 respectively as shown in FIG. 8. The spacers 76a, 76b may be made from a rigid material, for example a metallic material, or they may be made from a resilient material such as a silicone, polymer, elastomer, wood, or cardboard. The spacers 76a, 76b may have a convex shape similar to the dies 70, 74 shown in FIGS. 5A-5C, or they may simply provide a raised area to over compress the door skins S1, S2. The use of spacers 76a, 76b allows different sizes, shapes, and amounts of contour to be interchanged for different door sizes and designs. A human operator or robotic handling device may place the spacers 76a, 76b between the door skins S1, S2 and the upper and lower dies 70, 74 as the assembled door is loaded into the double press 64. The spacers 76a, 76b may also be placed either above or below the top belt of the conveyor 65 when used in conjunction with the exemplary embodiment depicted in FIG. 4. The handling device may determine the type of spacers 76a, 76b appropriate for the door based on information received from an operator, a central computing system, through image recognition, or various other techniques associated with variable batch production.

Figure 9:
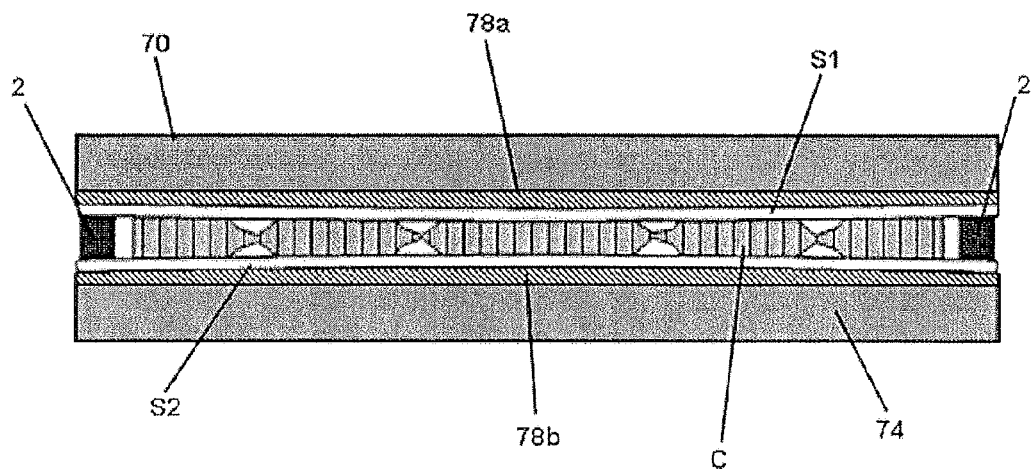
FIG. 9 is a sectional, schematic view of a door assembly in an exemplary door press utilizing attached plates.

In various other exemplary embodiments, the convex or raised portion is achieved through an upper plate 78a and a lower plate 78b that are attached to the upper and lower dies 70, 74 as shown in FIG. 9. The upper and lower plates 78a, 78b may be made from various materials including elastomeric, metallic, ceramic, cellulosic, or composite materials. Multiple upper and lower plates 78a, 78b may be used, each having a different size, shape, and/or radius of curvature. The different upper and lower plates 78a, 78b may be used in association with different door sizes and designs. The upper and lower plates 78a, 78b may be removably connected to the upper and lower dies 70, 74. For example, the plates 78a, 78b may be attached to the upper and lower dies 70, 74 through removable mechanical fasteners such as bolts or latches, or through a magnetic connection. Different upper and lower plates 78a, 78b may be interchanged manually or automatically as discussed above in relation to the upper and lower spacers 76a, 76b.

Figure 10:
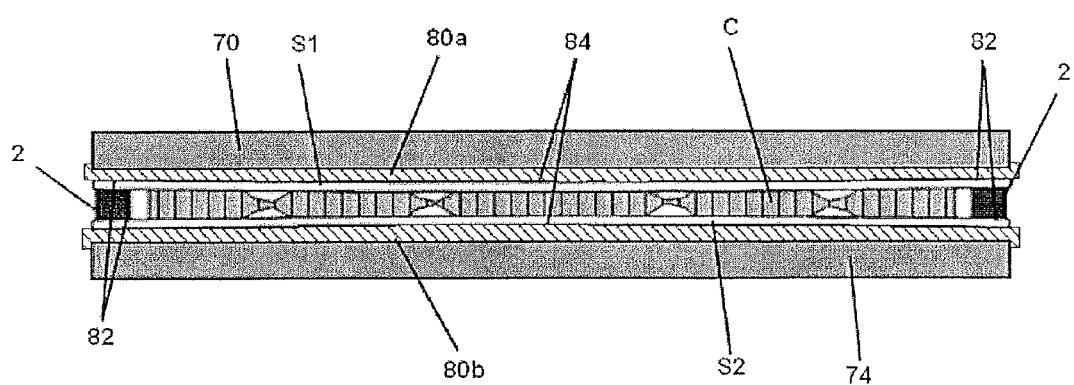
FIG. 10 is a sectional, schematic view of a door assembly in an exemplary door press utilizing membranes.

In various exemplary embodiments, the over compression of the door skins S1, S2 is achieved through an upper membrane 80a and a lower membrane 80b fastened to the upper and lower dies 70, 74 as shown in FIG. 10. The membranes 80a, 80b may have a thickness of about 0.1 mm to about 2.0 mm. The membrane may be made from a material that allows differential compression, such as a material comprising silicone or rubber. When pressed onto the door skins S1, S2, the compression of the upper and lower membranes 80a, 80b is greatest at the areas adjacent the rails and stiles 82 and decreases towards the center of the door 84. Therefore the upper and lower membranes 80a, 80b are thicker at the center of the door skins S1, S2 and cause over compression. The variable compression allows a single set of upper and lower membranes 80a, 80b to press different door sizes and designs. Accordingly, the upper and lower membranes 80a, 80b may be permanently attached to the upper and lower dies 70, 74 or they may be semi-permanently attached where a secure constant connection is desired but replacement upper and lower membranes may be provided. In various embodiments, however, the upper and lower membranes 80a, 80b may be removably secured to the upper and lower dies 70, 74 so that membranes 80a, 80b of different sizes, shapes, materials, or any combination thereof may be easily interchanged.

Figure 12:
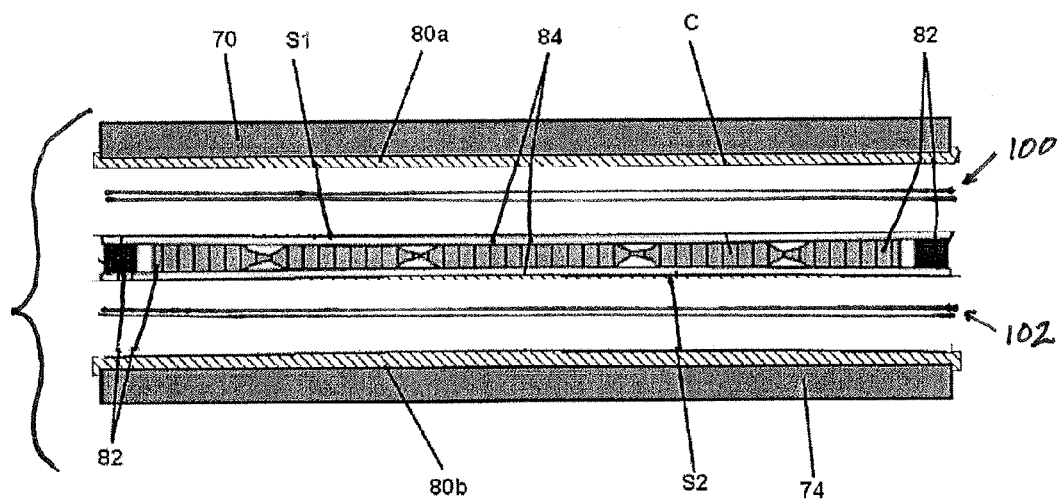
FIG. 12 is an exploded sectional, schematic view of a door assembly in an exemplary door press utilizing wear resistant membranes or belts.

In an effort to reduce or eliminate any markings in the surface of doors caused by the raised surfaces created by the upper and lower dies 70, 74, a further alternate embodiment to the present invention provides upper and lower membranes or wear resistant belts, shown as elements 100, 102 in FIG. 12, that substantially covers the entire platen surface including the surface of the upper and lower dies 70, 74 to prevent the hardened steel from marring the doors that are acted upon by the platen during the pressing process. The wear resistant belt is preferably formed with an internal rubber core of high durometer with an outer coating of a relatively softer material that is resistant to wear during the pressing process. Thus, the upper and lower membranes or wear resistant belts 198 define expandable, compressible members on top of the upper and lower dies 70, 74.

Figure 11:
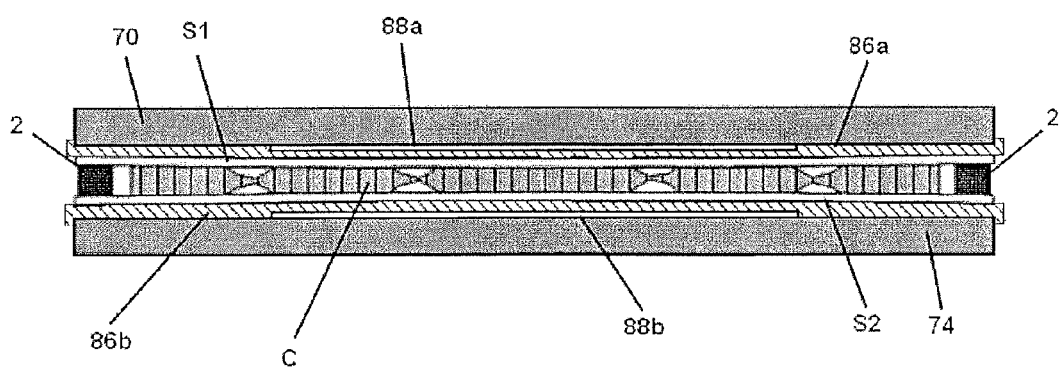
FIG. 11 is a sectional, schematic view of a door assembly in an exemplary door press utilizing expandable membranes.

In various exemplary embodiments, the convex or raised portion is achieved through an upper expandable membrane 86a and a lower expandable membrane 86b attached to the upper and lower dies 70, 74 as shown in FIG. 11. The expandable membranes 86a, 86b are made of an expandable or otherwise flexible material. Gas, such as compressed air, is supplied to upper and lower chambers 88a, 88b formed between the upper and lower dies 70, 74 and the upper and lower expandable membranes 86a, 86b respectively. The added pressure from the gas is transferred to the door skins S1, S2 and causes over compression during pressing. Though only a single chamber 88a, 88b is shown in FIG. 11 associated with each die 70, 74, there may be more than one chamber and the chambers may be selectively supplied with gas to provide different amounts of compression to different door sections or to different door sizes and designs.

As best shown in FIG. 1, after the pressing station 62, the assembled door D2 is taken off the main production line 1.

The door D2 then may pass through a number of optional finishing operations as needed. For example, the door may be passed through a stile trimming station 90 and a rail trimming station 92 to remove excess material. If the blades of the trimming stations 90, 92 are parallel the door may need to be rotated between the stile trimming station 90 and the rail trimming station 92. After the edges have been trimmed, the door may be placed through an edge coating station 94. Here the edges of the door, such as the exposed rails 6a, 6b and stiles 2 are coated or painted. Other painting or coating may be accomplished at this station or separately.

When the door D2 is completed, it passes to an inspector 96 who checks the door for quality issues. In various exemplary embodiments the quality inspection may be performed automatically as discussed above with respect to the door skin assembly station 40. Any unacceptable door is either discarded or reworked, and all doors passing inspection are sent to palletizer 98 for stacking.

A number of commonly used and commercially available adhesives have been discussed above such as PUR and EVA hot melt adhesives. However, aspects of the present invention are also directed to the novel use of adhesive compositions. In an exemplary embodiment, a PUR adhesive comprising polyurethane and isocyanurate is used in the above-disclosed system. In a separate embodiment, an adhesive comprising polyurethane and cyanoacrylate is used in the above-identified system. These chemicals increase the initial green or set strength of the adhesives, securing the bond between the door skin and the frame, eliminating delamination caused by the stresses of bowed or warped skins.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Additional embodiments are possible and are intended to be encompassed within this specification and the scope of the appended claims. The specification describes specific examples to accomplish a more general goal that may be accomplished in another way.

What is claimed is:

1. A door pressing station, comprising:
at least one press comprising an upper die having an upper surface and a lower die having a lower surface, the upper and lower surfaces facing one another to define a mold cavity in which a door assembly is to be received for a pressing process, wherein the door assembly comprises a door frame having stiles and rails forming a perimeter of the door frame, a first door skin and a second door skin, and the door skin being adhesively secured on opposite sides of the door frame;
a first wear resistant membrane disposed along said upper surface; and
a second wear resistant membrane disposed along said lower surface,
wherein said first and second wear resistant membranes prevent hardened steel forming the upper and lower dies from marring doors that are acted upon by the upper and lower dies during said pressing process, and
wherein the upper and lower surfaces are shaped to compress central portions of the door skins to a greater extent than peripheral portions disposed about a perimeter of the door skins, so that surfaces of the central portions and the peripheral portions of the door skins are coplanar with each other, and the peripheral portions are in contact with the stiles and rails of the door frame upon completion of the pressing operation.

2. The door pressing station of claim 1, wherein the first and second wear resistant membranes are constructed and arranged for imparting a concave shape to at least a central region of first and second door skins of the door assembly during said pressing process.

3. The door pressing station of claim 1, wherein the first and second wear resistant membranes are first and second wear resistant membranes are formed of the same material.

4. The door pressing station of claim 1, wherein the first and second wear resistant membranes are formed as a continuous belt with a central core having a higher durometer than an outer layer.

5. The door pressing station of claim 1, wherein the wear resistant membranes are removably fixed to the upper and lower dies.

6. The door pressing station of claim 1, wherein the wear resistant membranes are disposed to move relative to the upper and lower dies along a direction of travel of said doors.

7. A door pressing station, comprising:
   at least one press comprising an upper die having an upper surface,
   a wear resistant membrane disposed along said upper surface,
   wherein said wear resistant membrane prevents hardened steel forming the upper die from marring a door that is to be acted upon by the upper die during a pressing process,
   wherein the door comprises a door frame having stiles and rails forming a perimeter of the door frame, and a door skin adhesively secured on one side of the door frame, and
   wherein the upper surface is shaped to compress central portion of the door skin to a greater extent than peripheral portion disposed about a perimeter of the door skin, so that the surfaces of the central portion and the peripheral portion are coplanar with each other, and the peripheral portion is in contact with the stiles and rails of the door frame upon completion of the pressing operation.

8. The door pressing station of claim 7, wherein the wear resistant membrane is constructed and arranged for imparting a concave shape to at least a central region of a door skin of the door assembly during said pressing process.

9. A method of pressing an assembled door, comprising:
   providing a press comprising an upper die having an upper surface and a lower die having a lower surface, the upper and lower surfaces facing one another to define a mold cavity in which a door assembly is received for a pressing process, wherein the door assembly comprises a door frame having stiles and rails forming a perimeter of the door frame, a first door skin and a second door skin, with the door skins positioned on opposite sides of the door frame;
   providing wear resistant membranes along said upper and lower surfaces to prevent hardened steel forming the upper and lower dies from marring doors that are acted upon by the upper and lower dies during said pressing process;
   loading an assembled door in said press; and
   pressing the assembled door between the upper and lower dies, wherein the upper and lower surfaces are shaped to compress central portions of door skins of the door assembly to a greater extent than peripheral portions disposed about a perimeter of the door skins, so that surfaces of the central portions and the peripheral portions of the door skins are coplanar with each other, and the peripheral portions are in contact with the stiles and rails of the door frame upon completion of the pressing step.

10. The method of claim 9, further comprising the step of imparting a concave shape to at least a central region of first and second door skins of the door assembly.

\* \* \* \* \*